Patented June 27, 1939

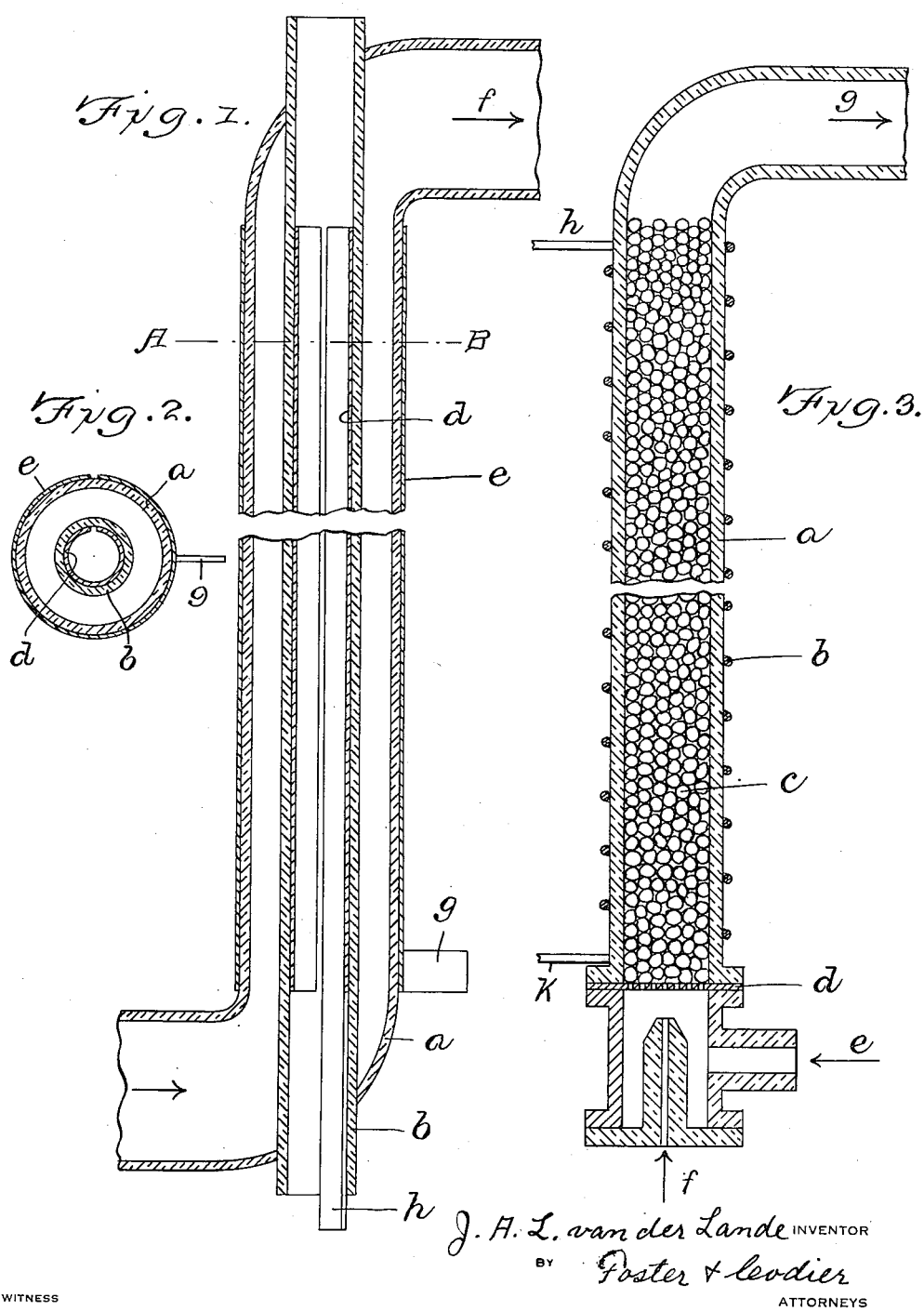

2,163,898

UNITED STATES PATENT OFFICE 2,163,898

PROCESS FOR THE PRODUCTION OF HYDROGEN PEROXIDE

Johannes Antonius Lebuinus van der Lande, Deventer, Netherlands, assignor to Naamlooze Vennootschap Industrieele Maatschappij Voorheen Noury & Van Der Lande, Deventer, Netherlands, a company of the Netherlands Application August 4, 1937, Serial No. 157,417
In the Netherlands August 14, 1936

6 Claims. (Cl. 23—207)

The production of hydrogen peroxide commonly commences with solutions of persulphuric acid or persulphate solutions acidified with sulphuric acid. The said solutions are then heated, usually with steam, and in an apparatus under decreased pressure, so that the hydrogen peroxide formed may be separated from the reaction mixture by distillation.

Now various processes are known which differ in the way in which the heat required for the reaction is supplied.

Thus indirect heating with steam is a method which is frequently applied. In this process the heat-exchange takes place practically always via a metal surface, preferably a leaden surface, which is considered to be a drawback, since metal surfaces catalytically promote the decomposition of the active oxygen-containing compounds.

It has further been proposed to heat the solutions directly with steam, as a result of which, of course, the $H_2O_2$ formed is diluted and at the same time the impurities in the steam (in most cases superheated) enter the reaction medium and cause decomposition with loss of oxygen.

Still another process is based on an electric heating of the said solutions. By setting up an alternating current voltage between electrodes which are placed in the solutions the heat is supplied by resistance heating. It has appeared that a drawback of this method is that the electrodes (in most cases metal) are quickly corroded.

It has now been found that the above-mentioned drawbacks of the well known processes are avoided and hydrogen peroxide may be obtained from solutions in which $H_2O_2$ is formed by heating, if the said solutions are heated by means of high frequency currents in an apparatus of electrically non-conductive material and at decreased pressure (pressure below atmospheric pressure). This may, for example, be attained by mounting two metal electrodes around the apparatus through which the solutions are conducted whilst between the said electrodes a very high frequency alternating current voltage is caused to arise.

In this case the whole acts as a condenser, which, owing to the high frequency of the current, permits ready passage of current. The required heat is thus supplied to the solutions which have good conductive properties. As the heat is exclusively liberated in the liquid to be heated there is no danger of superheating.

Another mode of carrying out the invention consists in winding a wire carrying the current round the tube through which the persulphate (persulphuric acid) solution flows. The alternating magnetic field thus set up causes electric phenomena (eddy currents) in the solution which also cause a heating of the liquid.

The process is thus in the first place, differentiated from the electric heating with low frequency currents by the fact that the liquid need not come into contact with the electrodes (in most cases metal) and accordingly it is less contaminated and is also exposed to decomposing influences to a smaller extent.

Since the tube through which the solution is conducted need not conduct the electric current, use may be made of a non-metal, for example, quartz as the material from which it is made. An additionl advantage is that such materials also conduct heat badly and, accordingly, provide a good insulation. For the rest, persulphate, persulphuric acid and hydrogen peroxide are compounds which are very sensitive to electric influences and it was, accordingly, not obvious that the process described could be carried out by means of ultra-short waves.

The satisfactory results may be partly explained by the fact that at high frequencies no electrolysis phenomena arise, whereas this is the case to a considerable extent if the heating is carried out with low frequency currents owing to the considerably slower alternation of the current. Use is preferably made of the so-called ultra-short waves with a wavelength below 300 metres. Bearing in mind that the product of the wave length and frequency (the number of alternations per second) of these waves equals or about equals the velocity of light and that the velocity of light is a little less than three hundred million metres per second, or roughly, three hundred million metres per second, it will be understood that waves with wave lengths below 300 metres correspond to waves having a frequency of at least of the order of magnitude of one million alternations per second. The exact choice of the wavelength must be made in consideration of the capacity and dimensions of the apparatus. Good results can be obtained particularly with waves from 2–10 metres while also waves upwards from 15 metres may be of importance having regard to practical considerations associated with the simpler generation.

It is advisable to subject the solutions to the action of the ultra-short waves in the form of a very thin layer or of a complex of thin layers. This may be attained by giving the walls of the vessel a shape suitable for the purpose or by filling the apparatus wholly or partly with material increasing the surface, such as Raschig-rings, Berl-Sattel bodies, balls, or other similar regularly or irregularly shaped filling material. As the thin liquid films are also formed on these filling materials, their surface is considerably extended.

The apparatus may be mounted either in a vertical or in a horizontal or inclined position.

The solution of persulphuric acid (persulphate) may be conducted from the top downwards or from the bottom upwards.

The solutions may be preheated if required.

It has further appeared that a better liquid film is obtained if a small quantity of dry steam, either superheated or not, is blown in in parallel- or countercurrent with the solution.

As regards the composition of the solutions from which the hydrogen peroxide is obtained, it has appeared that this may be varied within wide ranges.

Thus the ammonium persulphate concentration may lie between 100–250 grams per litre, the sulphuric acid content between 200–900 grams per litre and the ammonium sulphate concentration between 0–400 grams per litre.

If use is made of persulphuric acid solutions, the $H_2S_2O_8$ concentration may lie between 100 and 300 grams per litre while the sulphuric acid concentration may amount to 150–250 grams $H_2SO_4$ per litre.

Although solutions of the abovementioned composition give the best results, the process according to the invention may also be carried out with solutions the composition of which lies outside these limits.

As electrically non-conductive material for the apparatus glass, quartz or acid-proof earthenware come primarily into consideration.

The heating by the ultra-short waves must be such that sufficient heat is supplied to allow the hydrolysis of the solutions to be treated and the distillation of the $H_2O_2$ etc. formed to take place completely, if required, by the assistance of the steam supplied. The solution containing sulphuric acid and ammonium persulphate which is most frequently used requires 0.5–0.6 kw. h. per litre.

Example I

In an apparatus shown in longitudinal section in Fig. 1 and in transverse section at A—B in Fig. 2 and consisting of two concentric quartz tubes $a$ and $b$ having an internal diameter of 30 mm. and an external diameter of 10 mm. respectively, an aqueous solution is introduced at decreased pressure through the annular interspace at a rate of 5 litres per hour, the said solution containing 200 grams of ammonium persulphate and 300 grams of sulphuric acid per litre.

Copper sheets $d$ and $e$ covering a length of 500 mm. are mounted against the inside of the innertube and the outside of the outertube respectively.

The copper sheets are connected at $g$ and $h$ with an ultra-short-wave valve apparatus supplying an electric current of 100 million alternations per second (wavelength of the corresponding ether oscillation, 3 metres) to the apparatus at a voltage of 1200 volts.

In these circumstances 2500 calories per hour are supplied to the liquid. The electric yield is 90%.

While the liquid flows through the annular space, the $H_2O_2$ is formed and is converted into the vapour form together with part of the water. The whole mixture leaves at $f$ and subsequently enters a cyclone separator where the gaseous and liquid parts are separated. The gaseous portion is passed to a number of fractionating columns and a cooler, where the vapours of $H_2O$ and $H_2O_2$ are condensed in a fractionated state.

The liquid portion is diluted with water and returned to the electrolysing apparatus in which the sulphates formed in the process are again converted into persulphate for a new distillation.

Example II

As shown in Fig. 3 a quartz tube having an internal diameter of 20 mm. and a length of 60 cm. and filled with balls, Raschig-rings or similar filling bodies $c$ is taped with copper wire $b$ having a diameter of 2 mm. over a distance of 50 cm. The ends of this copper wire $h$ and $k$ are connected with the poles of an ultra-short wave spark apparatus, as a result of which a current of 10 million alternations per second (30 metres wave length) is applied to the apparatus at a voltage of 300 volts. An aqueous solution is introduced at a rate of 4 litres per hour into the quartz tube to $e$ at the bottom under decreased pressure, the solution containing 200 grams of ammonium persulphate, 200 grams of $H_2SO_4$ and 100 grams of ammonium sulphate per litre. At the same time per hour 1 kilogram of steam is blown in at $f$.

The electric yield is 75%. The products pass out at $g$ and the further course of the process takes place in the manner described in Example I.

I claim:

1. Process for the production of hydrogen peroxide which comprises subjecting a solution capable of yielding hydrogen peroxide on heating to the action of a high frequency electric field having a frequency of at least of the order of magnitude of one million alternations per second and arising from electrical conducting means out of direct contact with the solution being subjected to said field.

2. Process for the production of hydrogen peroxide which comprises subjecting a solution capable of liberating hydrogen peroxide on heating to the action of a high frequency electric field while the said solution is at a pressure below atmospheric pressure, said high frequency electric field having a frequency of at least of the order of magnitude of one million alternations per second and arising from electrical conducting means out of direct contact with the solution being subjected to said field.

3. Process for the production of hydrogen peroxide which comprises converting a solution capable of yielding hydrogen peroxide on heating into thin layer form and subjecting the solution in such form to the action of a high frequency electric field having a frequency of at least of the order of magnitude of one million alternations per second and arising from electrical conducting means out of direct contact with the solution being subjected to said field.

4. Process for the production of hydrogen peroxide which comprises spreading a solution capable of yielding hydrogen peroxide on heating into thin layer form, assisting the spreading of the solution into thin layer form by performing the spreading in the presence of a small amount of added dry steam, and subjecting said solution in such thin layer form to the action of a high frequency electric field having a frequency of at least of the order of magnitude of one million alternations per second and arising from electrical conducting means out of direct contact with the solution being subjected to said field.

5. Process for the production of hydrogen peroxide which comprises subjecting a solution capable of yielding hydrogen peroxide on heating to the action of a high frequency electric field having a frequency greater than one million alternations per second and arising from electrical conducting means out of direct contact with the solution being subjected to said field.

6. Process for the production of hydrogen peroxide which comprises subjecting a solution capable of yielding hydrogen peroxide on heating to the action of a high frequency electric field having a frequency of at least ten million alternations per second and arising from electrical conducting means out of direct contact with the solution being subjected to said field.

JOHANNES A. L. van der LANDE.